US005655412A

United States Patent [19]
Luik

[11] Patent Number: 5,655,412
[45] Date of Patent: Aug. 12, 1997

[54] MACHINE TOOL FREE OF JERKS AND VIBRATIONS CAUSED BY THE NEWTONIAN REACTION FORCES

[76] Inventor: Ilmar Luik, 169 Bolling Rd., Meridianville, Ala. 35759

[21] Appl. No.: 328,148

[22] Filed: Oct. 24, 1994

[51] Int. Cl.$^6$ .................................................. G05G 11/00
[52] U.S. Cl. ........................ 74/490.01; 74/5.34
[58] Field of Search ............... 74/490.01, 490.03, 74/5.34, 5.37, 845

[56] References Cited

U.S. PATENT DOCUMENTS

| | | | |
|---|---|---|---|
| 3,203,644 | 8/1965 | Kellogg | 74/845 |
| 4,562,391 | 12/1985 | Inoue | 318/568 |
| 4,919,586 | 4/1990 | Derby | 414/735 |
| 4,949,026 | 8/1990 | Mead | 318/649 |
| 5,024,112 | 6/1991 | Kidd | 74/845 |
| 5,090,260 | 2/1992 | Delroy | 74/845 |
| 5,248,923 | 9/1993 | Kimura et al. | 74/490.03 |

*Primary Examiner*—Charles A. Marmor
*Assistant Examiner*—David M. Fenstermacher
*Attorney, Agent, or Firm*—Mark Clodfelter

[57] ABSTRACT

A prime mover for a rotatable member supported for rotation in a single plane on a stationary base is provided wherein reaction torque applied to the base due to powering such rotation is greatly reduced. At least one gyroscopic mass in a gimbal support is mounted to the rotatable member, with an axis of rotation of the gyroscopic mass being generally parallel to the plane of movement of the member. A force is applied, as by a solenoid, to the gimbal in a direction normal to the plane of rotation so as to cause precession of the gyroscopic mass, thereby rotating the rotatable member. Applications of the invention include robotics and machine tools, where the rotatable member may be a swinging arm robot having a tool affixed to an end thereof, or a rotary table to which a workpiece is mounted.

10 Claims, 9 Drawing Sheets

MACHINE TOOL FREE OF JERKS AND VIBRATIONS CAUSED BY THE NEWTONIAN REACTION FORCES

FIELD OF THE INVENTION

This invention relates to Computer Numeric Controlled (CNC) machine tools, rotary index tables, swinging arm robots, and all other machines having having heavy rotatable members that are angularly accelerated and decelerated during operation, and particularly to such machines wherein precession of a relatively large gyroscopic mass is used as an energy source to power such rotational movements.

BACKGROUND OF THE INVENTION

At the present time, machine tools having large rotary members, such as swinging arm robots, are constructed so as to attenuate detrimental effects of reaction forces generated when the rotary members are moved. Typically, a servo motor or the like is mounted to a base of the machine, with the rotary member moved by the motor via a gear or pulley arrangement. When the rotary member is moved, reaction forces of the motor are absorbed into the heavy, well dampened mass of the base, which is generally of rigid cast iron or polymer machine construction and may be further secured to a concrete floor or other heavy foundation to further dampen these reaction forces.

While generally effective, the mass needed to provide damping for these reaction forces is expensive, as is the structure needed to support the mass of the machines. Further, machine accuracy is limited by the mass of the machine and its rigidity due to the fact that reaction forces are attenuated and not eliminated. Further yet, with increasing machining speeds, flexure of the base occurs when heavy loads are applied thereto by the motor, in turn causing machining accuracy to deteriorate proportionally.

The principles governing behavior of rotating bodies, hereinafter denoted as gyroscopic masses, are well understood, and have been used for many years in many forms as sensor elements to provide stabilizing signals for control of various vehicular contrivances, particularly aircraft. In other applications, relatively large gyroscopic masses, known as Control Moment Gyroscopes, (CMG) have been developed and mounted in spacecraft and used to maintain a fixed attitude of the spacecraft through the use of gyroscopic forces. From the 1970's through the present, HONEYWELL CORP. (™) of Phoenix, Ariz. has been a major source CMG technology as well as reaction wheel systems for satellite attitude control. During this time, intensive efforts have been made to refine performance capabilities and reliability of CMG technology. Among these endeavors was the successful development of a magnetically suspended reaction wheel for the Annular Momentum Control Device. For further information on these devices, the reader is directed to the following publications:

1) *THE ANNULAR MOMENTUM CONTROL DEVICE* by W. W. Anderson.
2) *ANNULAR MOMENTUM CONTROL DEVICES* by Ball Brothers Research Corp. of Boulder Colo.
3) *ANNULAR MOMENTUM CONTROL DEVICES, APPLICATION TO A LARGE SPACE TELESCOPE* Ball Brothers Research Corp. of Boulder Colo.
4) *MAGNETIC SUSPENSION SYSTEM FOR AN ANNULAR MOMENTUM CONTROL DEVICE*, Sperry Flight Control Systems. These references may be found at the REDSTONE SCIENTIFIC INFORMATION CENTER located on Redstone Arsenal, a military installation in Huntsville, Ala.

While the use of gyroscopic masses for stabilization purposes is well known, Applicant is unaware of any effort to use a gyroscopic mass to effect rotary movement of machine tools. Here, advantages are believed to be numerous, and include elimination of flexure of the mount of a machine tool by powering a rotary member mounted thereto without the power source being coupled to the mount. As such, the mount does not receive any reaction forces from the power source during rotation of the rotary member, but serves merely as a pivot for rotation. As a result, the base and supporting structure for the rotating member may be constructed using less weight, with less attendant cost. Also, machining accuracy should increase due to greater closed loop positional control of the rotating member. Further, it is believed that undesirable vibrations that typically cause "chatter" during a machining operation would be dampened by the gyroscopic mass.

A primary operational feature of the invention is the fact that ability to produce torque on a rotating member using a gyroscopic mass is dependent on two variables, namely rate of gimbal movement and momentum of the gyroscopic mass. For larger momentum values, small gimbal rates produce significant precession torques, which may be used to move the rotating member through large excursions with small reaction torques from gimbal movement applied to the rotating member. These small gimbal rates may be achieved using linear actuators, such as solenoids, which simplify control schemes. Another advantage is that since the rotating member typically rotates in a horizontal plane, and the linear actuator produces gimbal motion against the rotating member in a vertical plane, no cross-coupling of these forces occurs. As a result, reaction forces of the linear actuator against the rotating member should not act as a disturbance input in the arm control scheme. Yet another advantage of the present invention is that the gyroscopic mass, when undisturbed, maintains a fixed orientation of the rotatable member without applying reaction forces to the mount or base of the machine. This is superior to conventional servo systems, which when held stationary apply reaction forces to the base, causing loss of machining accuracy.

In accordance with the foregoing, it is a broad object of the invention to provide a power source for a rotating member mounted to a pivot to enable rotation of the member with little or no reaction forces from the rotating member applied to the pivot. It is another object of the invention to provide machine tools, such as a swinging arm robot, wherein precession of a gyroscopic mass is used to provide rotational energy so that little or no reaction forces from such rotation are generated, increasing accuracy and efficiency of machining operations. Other objects and improvements Will become apparent upon reading the following appended specification.

SUMMARY OF THE INVENTION

A machine tool is provided having a base, with a movable member mounted to the base for rotation in a single plane. At least one gyroscopic mass having an inner gimbal and an outer gimbal is mounted to the member such that a spin axis of the gyroscopic mass, when in a null position, is generally parallel to a plane of rotation and generally oriented toward a pivot point of rotation of the member. A first actuator is coupled to one of the inner and outer gimbal, and when operated, serves to angularly displace the spin axis of the gyroscopic mass in directions normal to the plane of movement of the member, precessing the gyroscopic mass to rotate the member. A second actuator is coupled to the other of the first and second gimbal, and when operated, angularly displaces the spin axis of the gyroscopic mass in directions parallel to the plane of movement of the arm, precessing the gyroscopic mass to return the spin axis to the null position. During operation of the first actuator, the second actuator locks the gimbal to the movable member to transfer precessional torque to the member, and when the second actuator is operated, the first actuator is deactivated, allowing the gyroscopic mass to freely precess, bringing the spin axis thereof back to the null position.

DETAILED DESCRIPTION OF THE DRAWINGS

Figure 1:
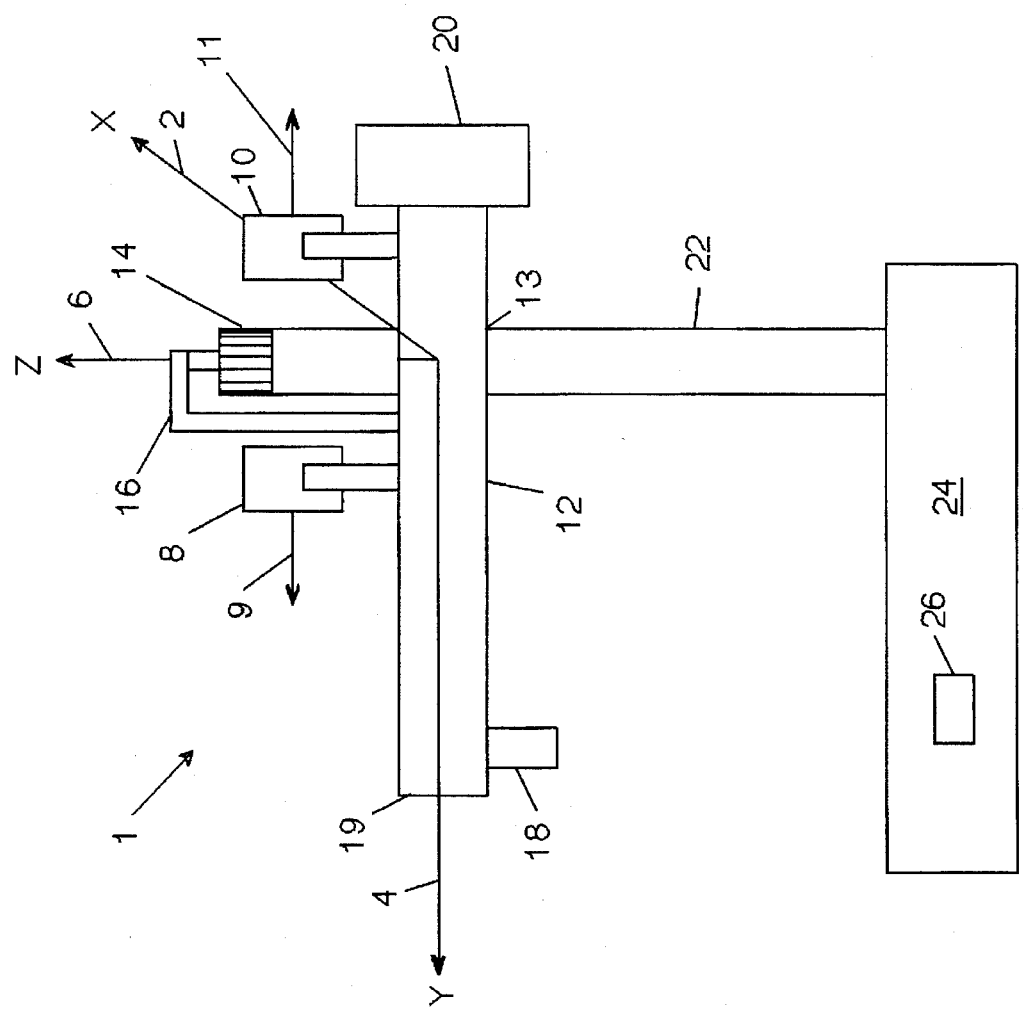
FIG. 1 is a schematic drawing of a robotic arm showing orientation of two gyroscopic masses relative to the arm.

Referring initially to FIG. 1, a swinging arm robot 1 is shown. Robot 1 is provided with a swinging arm 12 having a centerline 4, which rotates in a horizontal plane about an axis 6, this movement conventionally facilitated by antifriction bearings (not shown). Arm 12 is supported at a pivot point 13 by a support 22, in turn fixed to a base or mount 24. A tool 18 is mounted to an end 19 of swinging arm 12, the arm being rotated to bring the tool into contact with a workpiece (not shown). A counterweight 20 is mounted to an opposite end of arm 12 so that a center of gravity is oriented generally at pivot point 13. An angular rotation transducer 14 is conventionally coupled via a bracket 16 to sense angular position of arm 12, with a signal from transducer 14 utilized to provide closed loop positional control of arm 12, as is well understood by those skilled in the art. When operation of the robot is on a ship, a pitch, roll, and yaw sensor 26 may be fixed to base 24 to sense these motions and provide corresponding corrective signals.

A first gyroscopic mass 8 is mounted to arm 12 in gimballed relation on one side of pivot point 13, and a second gyroscopic mass 10 is mounted in gimballed relation to arm 12 on the other side of pivot point 13. These gyroscopic masses 8 and 10 have spin axes 9 and 11, respectively, with direction of spin of these gyroscopic masses being in opposite directions so that rotational torque of the gyroscopes cancel each other and their respective precession cooperate to rotate arm 12. A coordinate system is defined by the horizontal X-Y plane of movement of swinging arm 12, with the Z axis defined by axis 6. Where computer control of arm 12 is used, this coordinate system locates arm 12 with respect to a workpiece and allows machining operations thereon, as is common with CNC machines in use today.

Figure 2:
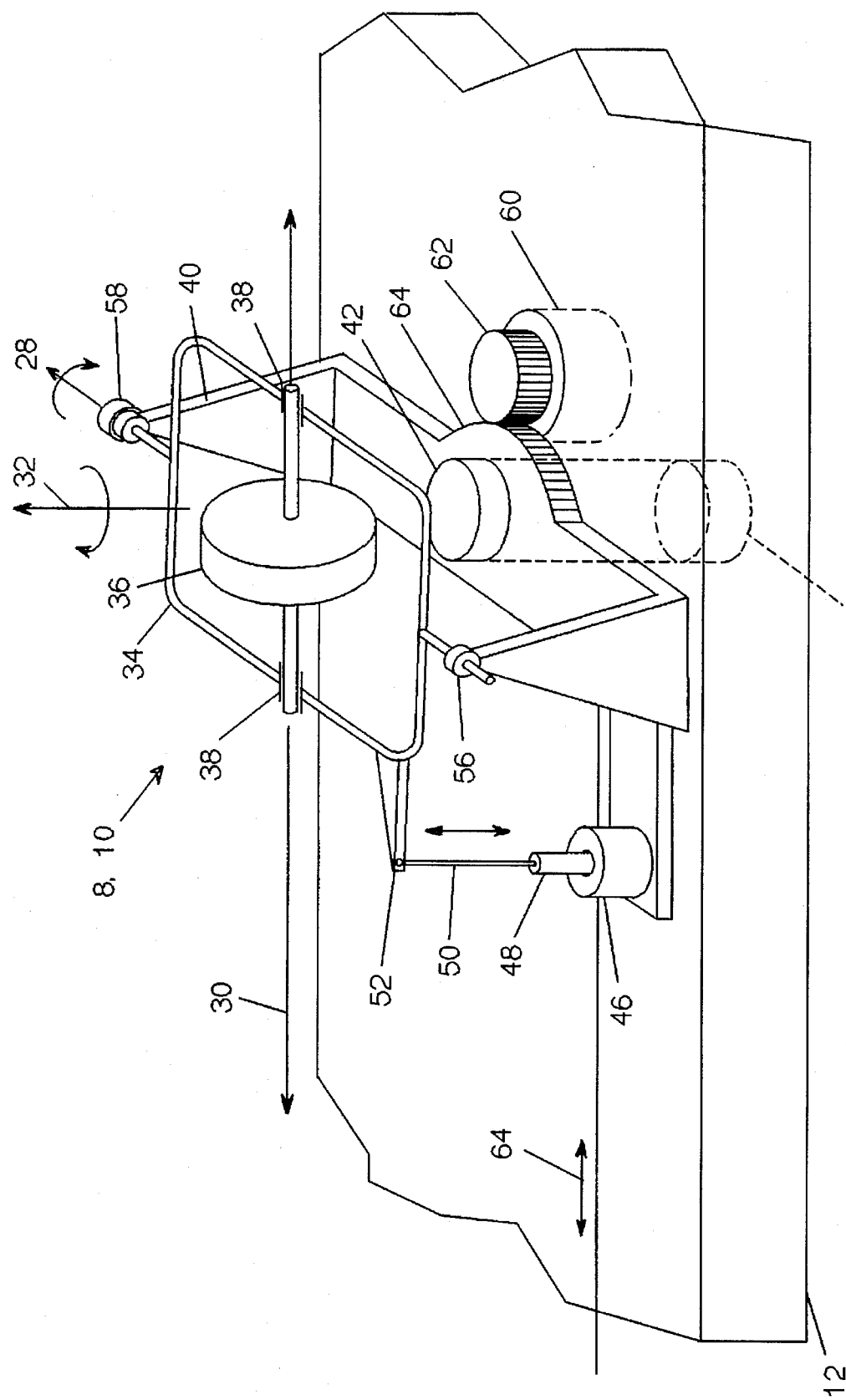
FIG. 2 is a diagrammatic illustration of a gyroscopic mass coordinate system and gimbal angle definitions.

Referring to FIG. 2, one of gyroscopic masses 8, 10 is shown diagrammatically in greater detail. Here, each gyroscopic mass 36 is supported for rotation by antifriction bearings 38 mounted in an inner gimbal 34, in turn supported for rotation about an axis 28 in an outer gimbal 40. A position sensing transducer 58 is mounted to sense position of inner gimbal 34 with respect to axis 28. The outer gimbal 40 is in turn supported for rotation about an axis 32 by antifriction bearings 42, with an angular position transducer 44 (dashed lines) mounted so as to sense angular position of outer gimbal 40 with respect to axis 32. A servo motor 60 fixed to arm 12 is provided with a pinion gear 62, gear 62 acting against bull gear 64 fixed to outer gimbal 40. With this construction, an error signal provided to servo motor 60 causes outer gimbal 40 to rotate about axis 32. It is to be noted that servo 60 is offset from and independent of pivot point 13 and support 22 (FIG. 1), with reaction forces from servo 60 applied directly to arm 12 and not pivot For inducing precession of gyroscopic mass 36, a linear actuator 46, such as a solenoid, is mounted to outer gimbal 40. A movable plunger 48 of solenoid 46 is coupled via a link 50 to lever 52, in turn fixed to inner gimbal 34. As such, movement of plunger 48 moves inner gimbal 34 vertically about axis 28, causing gyroscopic mass 36 to precess in a horizontal direction, with this force transferred to outer gimbal 40. With no error signal, a current flow is provided to servo motor 60 to lock it in place, transferring precessional torque to arm 12, causing horizontal movement thereof. Conversely, when a control current is applied to servo motor 60 to rotate outer gimbal 40, precession of gyroscopic mass 26 occurs about axis 28, returning plunger 48 to a neutral or null position. In this null position, the spin axes of the gyroscopic masses are generally parallel with a rotational plane of arm 12, and are generally oriented toward pivot point 13. It should be noted that the spin axes may vary from the described relationship within the throw of the solenoid link, and also may vary angularly with respect to being oriented toward pivot point 13 within the range of travel of bull gear 64. In this latter instance, the counterrotating gyroscopic masses provide symmetrical precessional forces to arm 12, producing smooth rotation thereof. When solenoid 46 is energized, reaction force is applied vertically to outer gimbal 40, and in turn is transferred to arm 12. When a control signal is applied to servo 60, reaction force is also applied to arm 12 through servo 60. With this construction, precessional reaction forces are applied to arm 12, and not to support 22 or pivot 13. With two counterrotating gyroscopic masses mounted as shown on either side of pivot 13, an upward application of force from one of solenoids 46 to its respective inner gimbal 34 requires a downward application of force from the solenoid of the other gyroscopic mass to its inner gimbal 34 in order to develop cooperating precessional torques needed to rotate arm 12.

Figure 3:
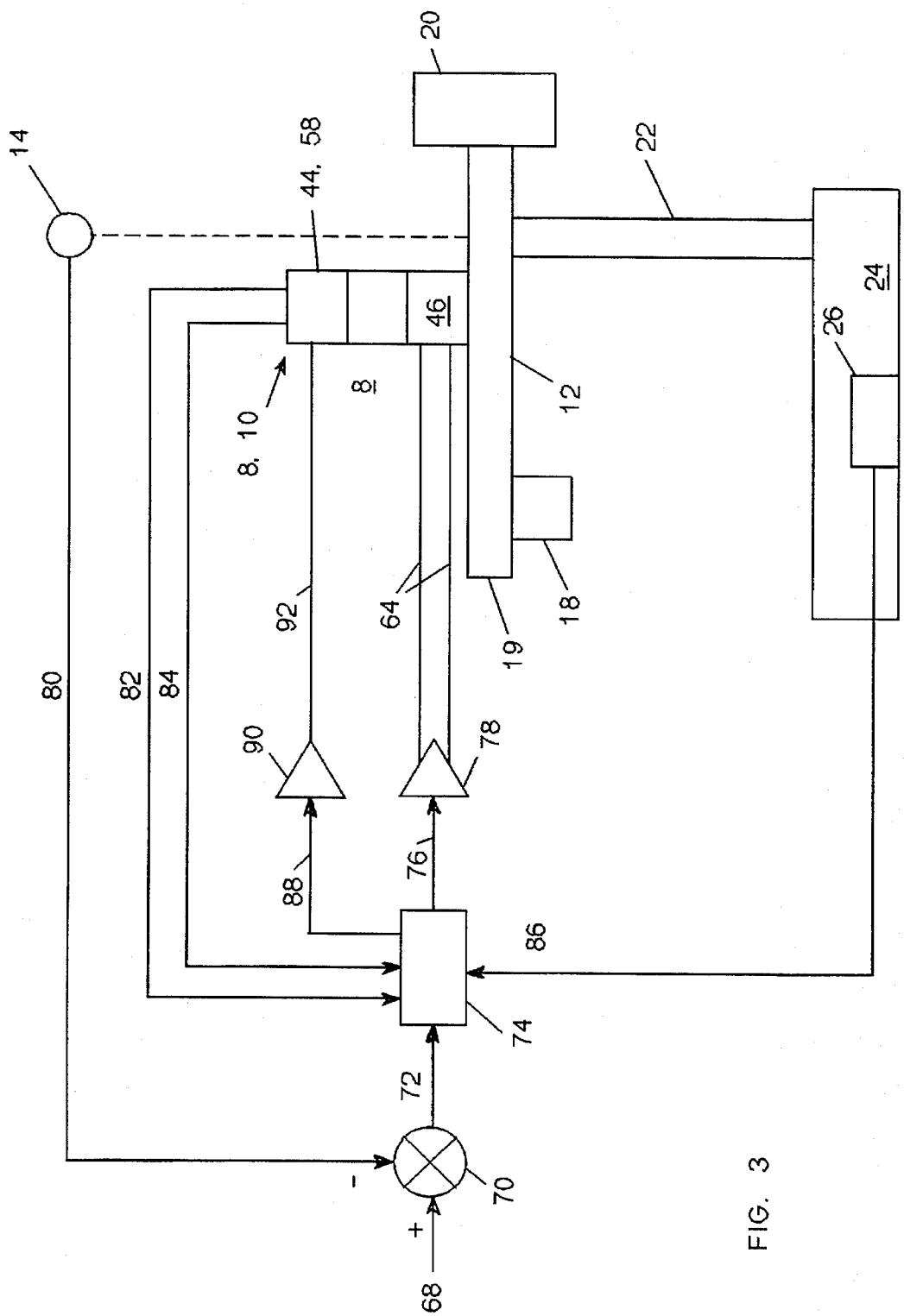
FIG. 3 is a schematic diagram of a swinging arm position control scheme.

FIG. 3 schematically illustrates an example of closed loop control circuitry for controlling movement of arm 12. A position command 68 to drive arm 12 to a new position is compared against position 80 from angular position transducer 14 of arm 12 by summing circuit 70. The output 72 of circuit 70 is a position error signal of arm 12, and is provided as an input to computer 74. Computer 74 operates in conjunction with error signal 72 to produce command signals 76, which are amplified in amplifier 78 to develop drive signals 64 for solenoid 46. Additionally, an input 82 is provided from position transducer 58, and another input 84 is provided from position transducer 44 (FIG. 2). These inputs are used by computer 74 in a closed loop mode to develop error signals when the inner gimbal and outer gimbal are positioned in other than null positions, and drive these gimbals back to null positions at appropriate times. Additionally, the computer may be configured to scale variables, establish system gain, filter sensor inputs, shape acceleration and velocity versus time profiles of the swinging arm, and perform other functions related to computer operation of the instant invention.

Figure 4:
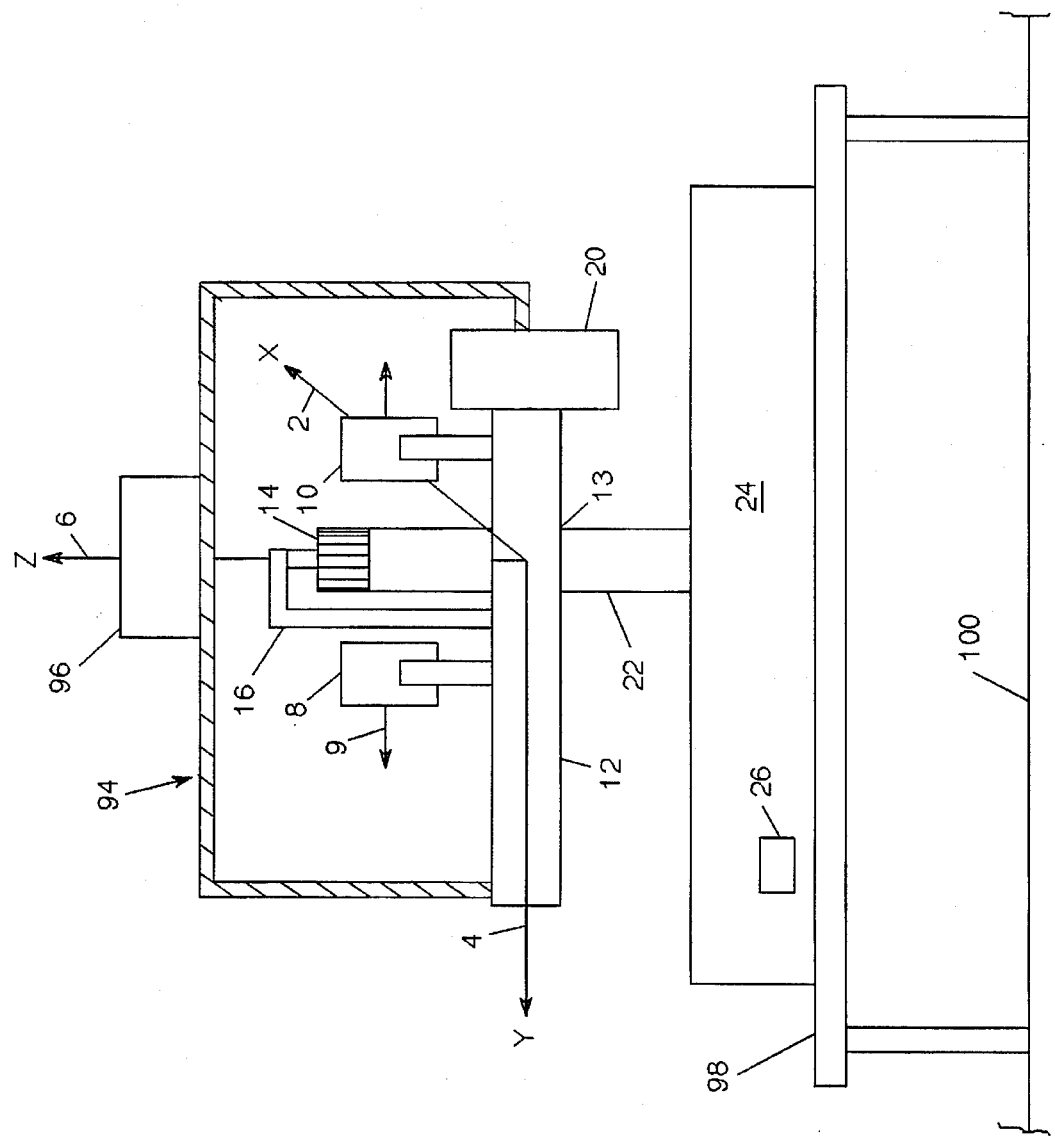
FIG. 4 is a diagrammatic illustration of the present invention configured to operate a programmable rotary table.

As shown in FIG. 4, another embodiment of the present invention is shown wherein a circular plate 94 is mounted above and to arm 12 so that the circular plate rotates around Z axis 6 of FIG. 1. This configuration allows the device to function as a rotary table that can be angularly accelerated and decelerated without applying any reaction torque from such acceleration and deceleration to table 98 upon which plate 94 is mounted. In this application, rectangular to polar coordinate algorithms such as described in *POLAR COORDINATE MACHINE CONTROL SYSTEM*, by Delta Tau Data Systems Inc. of Northridge, Calif., which was displayed at the POWER CONVERSION AND INTELLIGENT MOTION CONFERENCE at Irvine, Calif. on Oct. 27, 1993, may be used to duplicate functions of conventional rectangular coordinate-based CNC machines.

Figure 5:
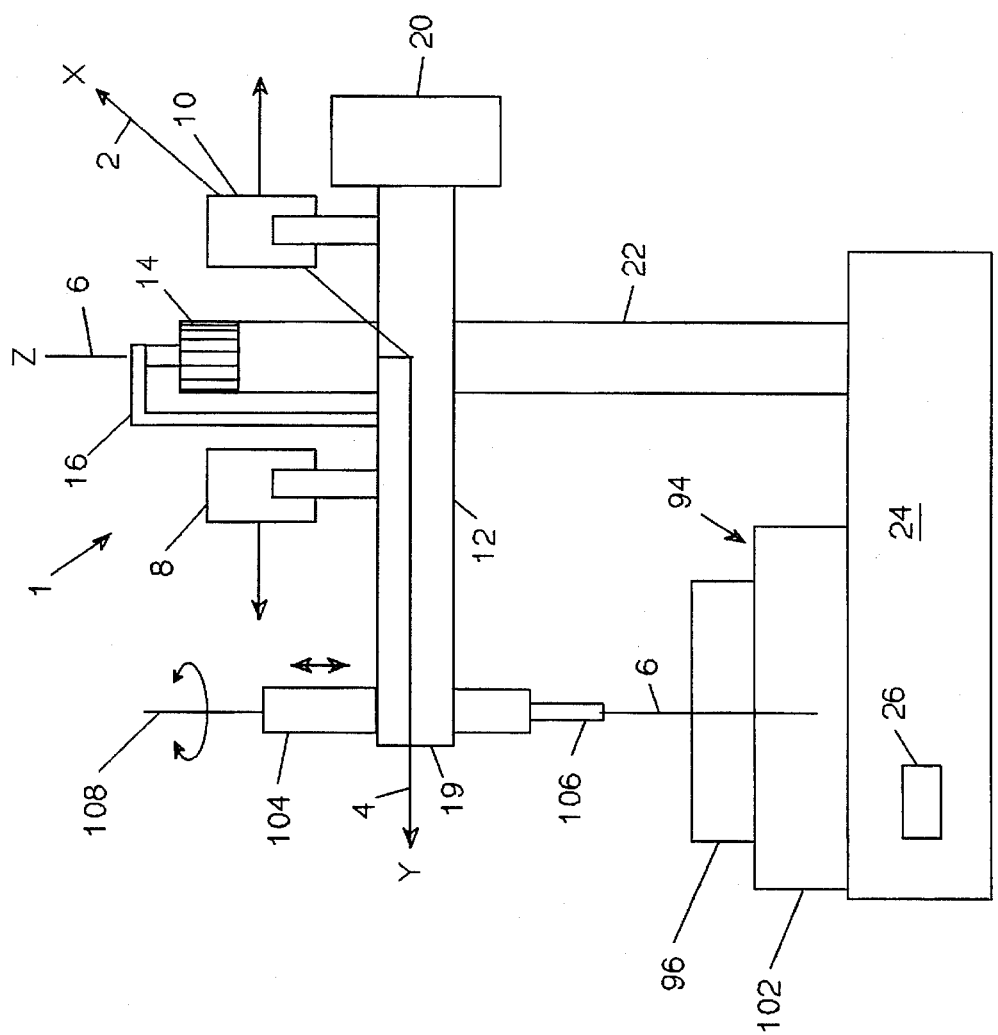
FIG. 5 is a diagrammatic illustration of the swinging arm robot of FIG. 1 combined with a programmable rotary table.
Figure 6:
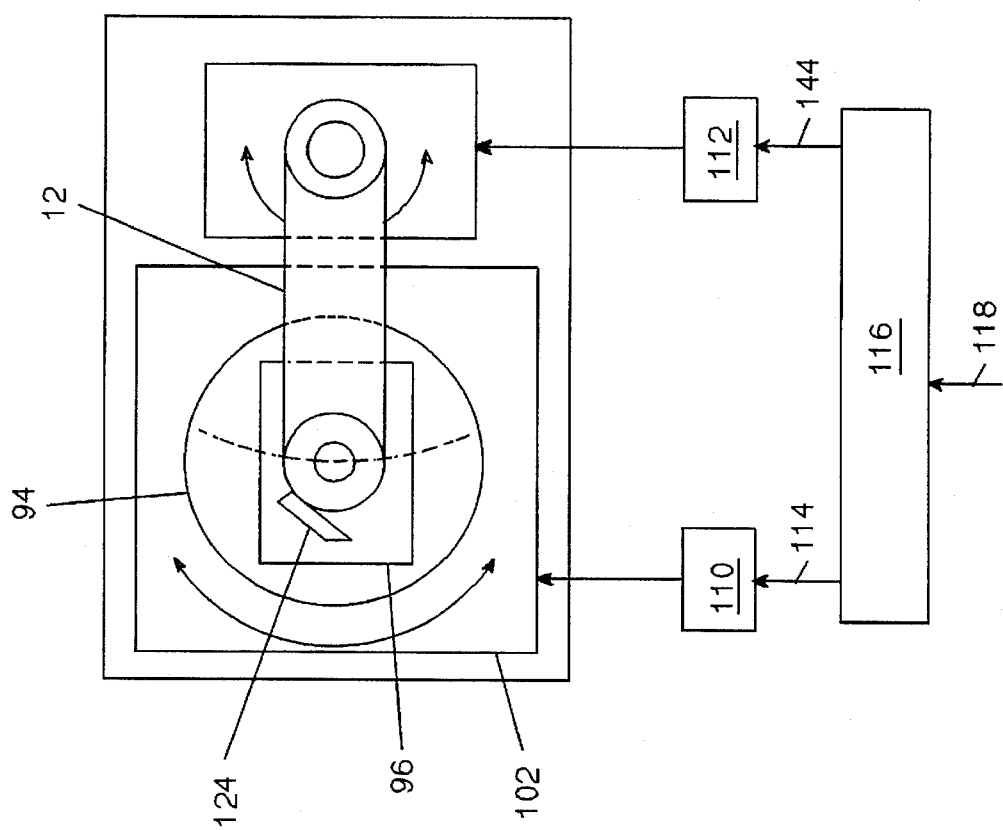
FIG. 6 is a diagrammatic illustration of the present invention mounted to operate a CNC vertical mill.

FIGS. 5 and 6 illustrate another embodiment wherein the plate 94 of FIG. 4, and its associated hardware 102 incorporating a swinging arm and counterrotating gyroscopic masses 8 and 10 (not shown), is mounted to base 24, with a swinging arm robot 1 as described for FIG. 1 mounted thereover. In this embodiment, a machine tool, such as an end mill 104 having vertical movement capabilities and a tool bit 106 having a spin axis 108 is mounted to end 19 of arm 12. Table 94 rotates about axis 6 so that combined movements of table 94 and arm 12 under control of an X-Y coordinate control system as referenced in the foregoing will bring every point of a workpiece 96 under spindle 106. As such, any pattern referenced by X-Y coordinates, as indicated by pattern 124 on workpiece 96, can be traced or duplicated. Further, depth of the pattern along the Z axis may be controlled either manually or automatically by controlling elevation of spindle 104, as is known by those skilled in the art. For controlling motions of table 94 and arm 12, and referring to FIG. 6, position and velocity commands 118 are provided to rectangular to polar converter 116, which computes polar coordinates for rotary table 94 and applies such polar coordinates to box 110. Box 110 contains a control system substantially as shown for FIG. 3, and controls motions of the rotary table. Additionally, polar coordinates are calculated and applied to box 112, also substantially configured as shown in FIG. 3, which in turn apply control signals to swinging arm 12. In the absence of computer control, positional signals from transducers mounted as described in the foregoing may be used in a simple closed loop position control system.

The following formulas illustrate derivation of moment equations of the swinging arm, and which lay be used to devise a computerized control system.

The total angular momentum of the robot arm and two CMGs about the origin of the coordinate frame (shown in FIG. 1) is $$\underline{H} = \underline{H}_A + \underline{h}_C \tag{1}$$

where $\underline{H}_A$ is the angular momentum of the arm about the origin and $\underline{h}_C$ is the angular momentum of the CMGs, also about the origin. Here we assume the center-of-gravity of the arm is coincident with the origin. This can be achieved by proper choice of the counter weight. In practice, the translation of the tool must be taken into account. This is rather straightforward but will not be addressed here.

The theory of angular momentum states that the total torque applied to a body is equal to the total time derivative of the angular momentum of the body. That is $$\underline{T} = \underline{\dot{H}} \tag{2}$$

If $\underline{H}$ is written in the arm-fixed coordinate frame, Equation (2) can be expressed as $$\underline{T} = \underline{\dot{H}} + \underline{\Omega} \times \underline{H} \tag{3}$$

where $\underline{\Omega}$ is the angular velocity vector of the arm-fixed coordinate frame and a small circle above a vector denotes the time rate of change of that vector in the rotating coordinate frame. Using Equations (1) and (3), we can write $$\underline{T} = \underline{\dot{H}}_A + \underline{\Omega} \times \underline{H}_A + \underline{\dot{h}}_C + \underline{\Omega} \times \underline{h}_C \tag{4}$$

Since we have control of the CMG angular momentum, we are therefore led to define a control torque as $$\underline{T}_C = -(\underline{\dot{h}}_C + \underline{\Omega} \times \underline{h}_C) \tag{5}$$

The angular momentum of the CMG pair is given by $$\underline{h}_C = h[(\cos \delta_1 - \cos \delta_2)j + (\sin \delta_1 - \sin \delta_2)k] \tag{6}$$

where j and k are unit vectors directed along the arm-fixed y and z axes, respectively, and $\delta_1$ and $\delta_2$ are gimbal angles of CMG 1 and 2, respectively. The control torque is $$\underline{T}_C = -h[(-\dot{\delta}_1 \sin \delta_1 + \dot{\delta}_2 \sin \delta_2)j + (\dot{\delta}_1 \cos \delta_1 - \dot{\delta}_2 \cos \delta_2)k] + (\Omega_y h_z - \Omega_z h_y)i + (\Omega_z h_x - \Omega_x h_z)j + (\Omega_x h_y - \Omega_y h_x)k \tag{7}$$

where $h_x$, $h_y$ and $h_z$ are components of $\underline{h}$ and $\Omega_x$, and $\Omega_y$ and $\Omega_z$ components of $\Omega$, all in the arm-fixed coordinate frame. By employing the proper constraints and making certain observations, we can simplify equation (7). First, note that $\Omega_x = \Omega_y = 0$ since the arm is free to rotate about the z axis only. Next, observe that $\underline{h}$ must remain in the y-z plane so $h_x = 0$. Further, we can select a gimbal rate control law which will provide the following constraint $$\dot{\delta}_1 = -\dot{\delta}_2 \tag{8}$$

This leads to $$\delta_1 = \delta_2 \tag{9}$$

if $\delta_1(0) = \delta_2(0)$. This condition is not restrictive and may actually result in some benefits. One potential benefit is that the arm can be rotated about the z axis (possibly by hand) without the CMGs producing a counter torque about the z axis. Now note that $\cos(-\delta_2) = \cos(\delta_2) = \cos(\delta_1)$. Since $\cos(\delta_1) = \cos(\delta_2)$ by the control law, then $h_y = 0$. These constraints lead to the following expression for the control torque $$\underline{T}_C = -h\{[-\dot{\delta}_1 \sin(\delta_1) + \dot{\delta}_2 \sin(\delta_2)]j + [\dot{\delta}_1 \cos(\delta_1) - \dot{\delta}_2 \cos(\delta_2)]k\} \tag{10}$$

This equation can be further simplified by noting that $\sin(-\delta_2) = -\sin(\delta_2) = \sin(\delta_1)$. This results in $$T_C = -2h\dot{\delta}_1 \cos(\delta_1)k \quad (11)$$

The angular momentum of the robot arm is $$\underline{H}_A = I \cdot \underline{\Omega} \quad (12)$$

where I is the inertia dyadic of the arm. The moment equation for the arm is $$\underline{\dot{H}}_A = I \cdot \underline{\dot{\Omega}} + \underline{\Omega} \times I \cdot \underline{\Omega} \quad (13)$$

if we assume the inertia of the arm is constant. Referring to Equation (4), we can write $$\underline{T} + \underline{T}_C = I \cdot \underline{\dot{\Omega}} + \underline{\Omega} \times I \cdot \underline{\Omega} \quad (14)$$

If the only torque applied to the arm is the control torque, then we obtain $$-2h\dot{\delta}_1 \cos(\delta_1)k = I \cdot \underline{\dot{\Omega}} + \underline{\Omega} \times I \cdot \underline{\Omega} \quad (15)$$

Equating like components on both sides of this equation yields $$I_{zz}\dot{\Omega}_z = -2h\dot{\delta}_1 \cos(\delta_1) \quad (16)$$

Of course, other torque components can be found by using Equation (14). For example, the moment about the x-axis due to inertial cross-coupling is $I_{yz} \Omega^2_z$. This moment is canceled by the reaction torque produced by the shaft bearings. The moment about the y-axis due to cross-coupling is canceled by bearing reaction also. Other torque components are eliminated because we have required that the arm rotate about the z-axis only.

Equation (16) is used to find $\dot{\Omega}_z$ as a function of CMG parameters and the arm's moment of inertia about the z-axis.

$$\dot{\Omega}_z = -2h\dot{\delta}_1 \cos(\delta_1)/I_{zz} \quad (17)$$

Equation (17) is integrated to find the arm's angular rate and angular displacement.

Figure 7:
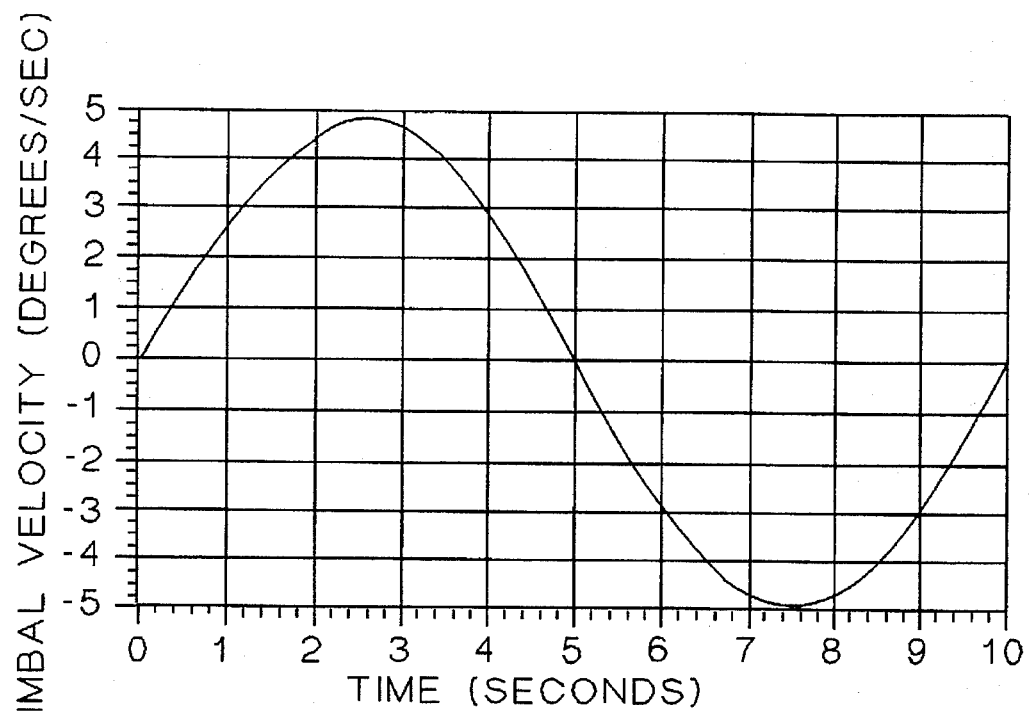
FIG. 7 is a plot of gimbal velocity in degrees per second versus time in seconds.
Figure 8:
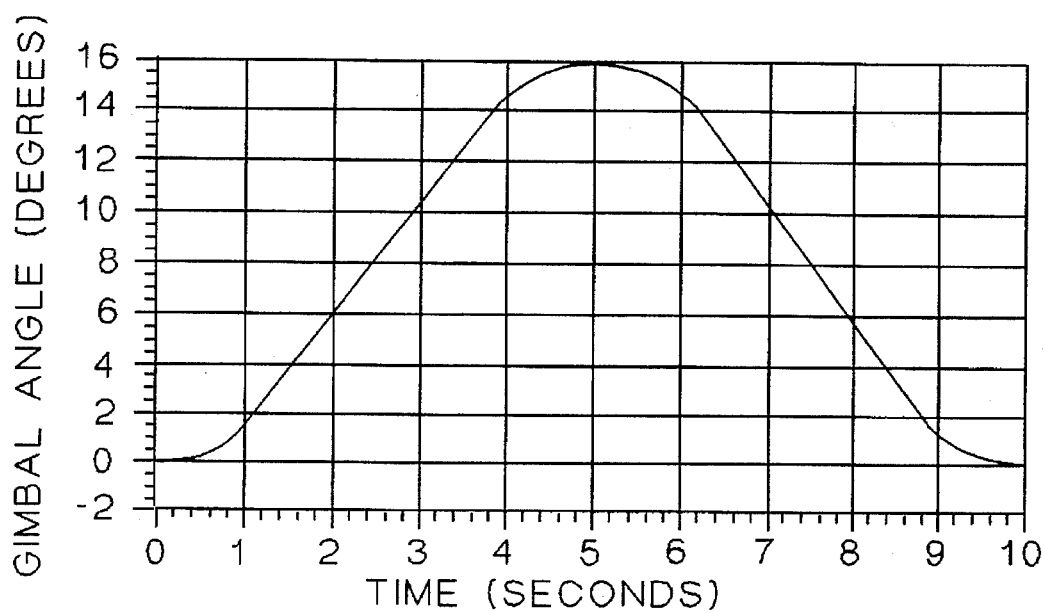
FIG. 8 is a plot of gimbal angle in degrees versus time in seconds.

With respect to FIGS. 7–11, the results of a computer simulation to test feasibility of the concept and determine the order of magnitude of key parameters are shown. The parameters used in the simulation are as shown in the following tables:

CMG FLYWHEELS:
radius: 6 inches
thickness: 1 inch
mass: 0.176 slugs
moment of inertia about spin axis: 0.022 slug-ft$^2$
gimbal rate control law: $\delta$=5 sin (0.2 $\pi$t) degrees/sec
spin rate: 10,000–60,000 RPM
angular momentum: 23.04–138.23 ft/lb/sec
SWINGING ARM
length: 6 feet
cross section: 1 foot square with 0.5 inch wall thickness
material: steel
mass: 14.32 slugs
tool mass: 3.1 slugs located 5 feet from rotation axis
counterweight mass: 44.135 slugs located 1 foot from axis
moment of inertia: $(I_{zz})$=196.9 slug-ft$^2$
center of gravity: located on rotation axis Given the parameters in the above tables, FIGS. 7 and 8 show plots of inner gimbal rate and angular displacement versus time. Here, the maximum gimbal rate is 5 degrees/second, which is in agreement with the gimbal rate control law as stated above. The maximum gimbal angle is 16 degrees. This relatively small excursion of the gimbal produces a relatively large movement of the swinging arm, which is a function of the flywheel angular momentum.

Figure 11:
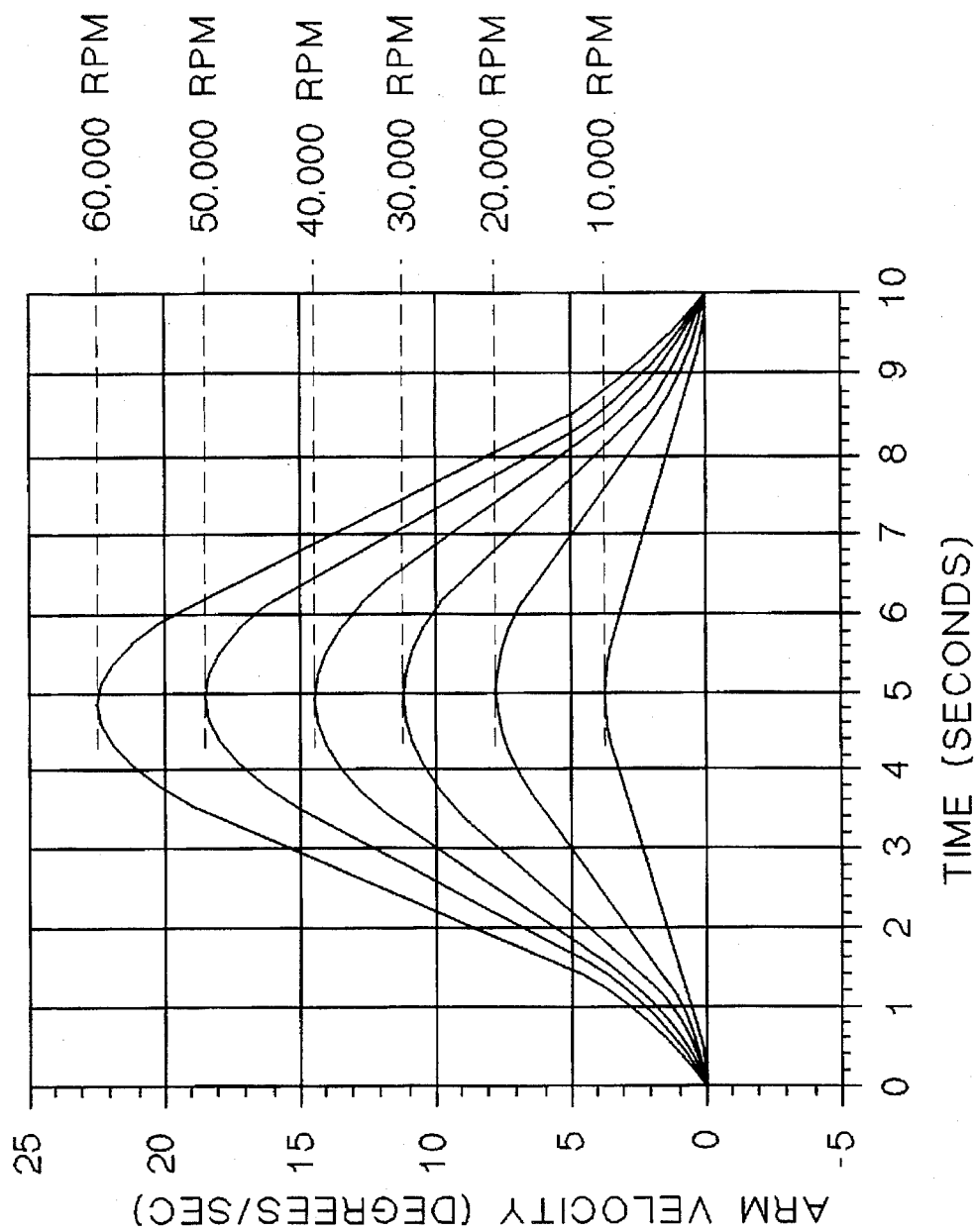
FIG. 11 is a plot of arm velocity versus time in seconds using rotation rates of from 10,000 RPM to 60,000 RPM.
Figure 9:
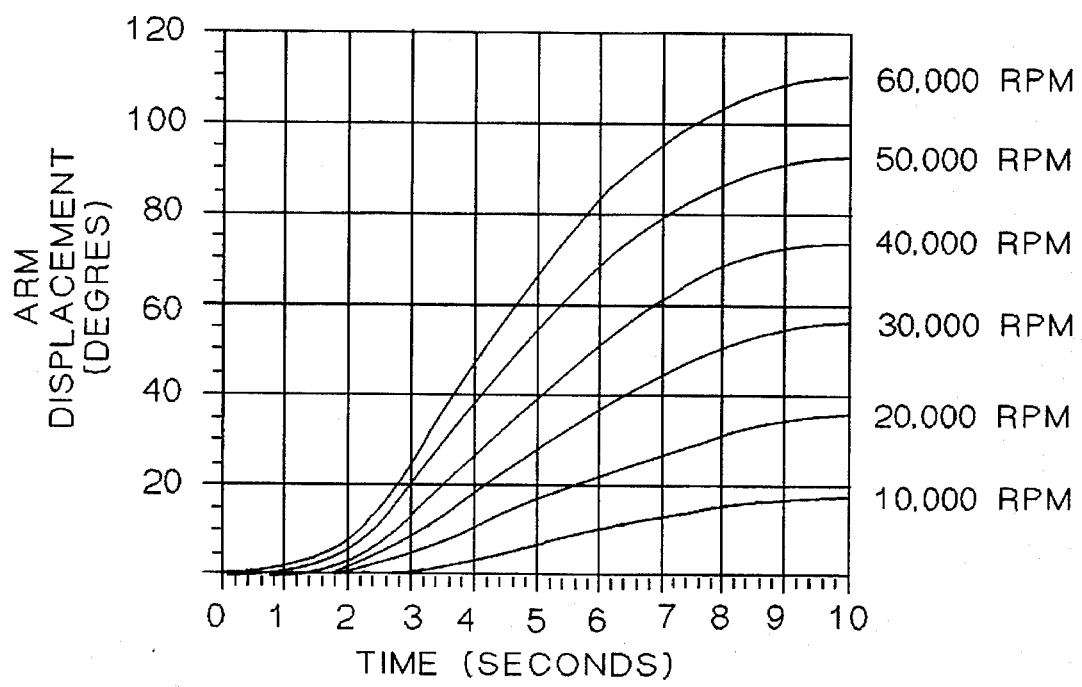
FIG. 9 is a plot of arm displacement versus time in seconds using gyroscopic rotation rates of from 10,000 RPM to 60,000 RPM.
Figure 10:
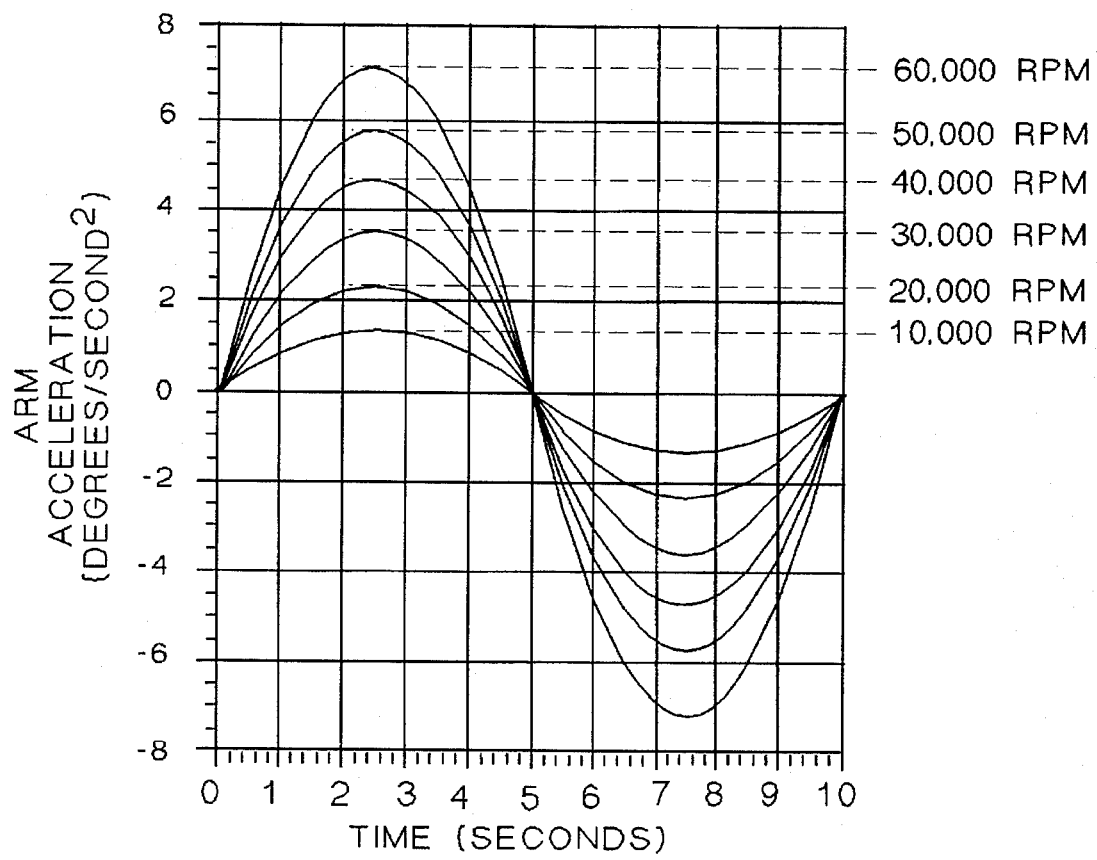
FIG. 10 is a plot of arm acceleration versus time in seconds using gyroscopic rotation rates of from 10,000 RPM to 60,000 RPM.

FIGS. 9–11 show swinging arm angular displacement, angular acceleration, and angular velocity versus time. Various flywheel spin rates from 10,000 RPM to 60,000 RPM were used. With these spin rates, which are easily achievable, relatively large swinging arm angles and rates are possible. For example, with a flywheel rotating at 30,000 RPM and a sinusoidal gimbal rate of 5 degrees/second maximum, the arm is capable of being rotated through a 55 degree angle with a maximum arm angular rate of about 11 degrees/second.

Having thus described my invention and the manner of its use, it is apparent that incidental modifications may be made thereto that fairly fall within the scope of the following appended claims, wherein I claim:

1. A machine tool comprising:
   a base,
   a movable member supported for free rotation in one plane of movement about a pivot point on said base,
   a first gyroscopic mass having a first spin axis,
   a first inner gimbal rotatably supporting said first gyroscopic mass so that said first spin axis, in a null position, is substantially parallel to said plane of movement of said movable member and substantially aligned with an axis of said pivot point,
   a first outer gimbal rotatably supporting said first inner gimbal for rotation about an axis parallel to said plane of movement and perpendicular to said first spin axis, said first outer gimbal rotatably mounted to said arm for movement about an axis normal to said plane of movement of said arm,
   a first actuator coupled to apply force between said first inner gimbal and said first outer gimbal, angularly displacing said spin axis relative to said arm in directions normal to said plane of movement,
   a second, selectively lockable actuator mounted to said arm and coupled to said first outer gimbal, for displacing said first spin axis relative to said arm in directions parallel to said plane of movement,
   whereby with said first actuator energized and said second actuator locked, said first gyroscopic mass is precessed, moving said arm in said plane of movement, and with said second actuator energized, said first gyroscopic mass is freely precessed to drive said spin axis back to said null position.

2. A machine tool as set forth in claim 1 further comprising:
   a second gyroscopic mass having a second spin axis in counterrotating relation to said first gyroscopic mass,
   a second inner gimbal rotatably supporting said second gyroscopic mass so that said second spin axis, in a null position, is substantially parallel to said plane of movement of said movable member and substantially aligned with an axis of said pivot point,
   a second outer gimbal rotatably supporting said second inner gimbal for rotation about an axis parallel to said plane of movement and perpendicular to said second spin axis, said second outer gimbal rotatably mounted to said arm opposed from said first gyroscopic mass with said pivot point between said first gyroscopic mass and said second gyroscopic mass, for movement about an axis normal to said plane of movement of said arm,
   a third actuator coupled to apply force between said second inner gimbal and said second outer gimbal, angularly displacing said spin axis of said second gyroscopic mass relative to said arm in directions normal to said plane of movement, a fourth, selectively lockable actuator mounted to said arm and coupled to said second outer gimbal, for displacing said second spin axis relative to said arm in directions parallel to said plane of movement, whereby with said third actuator energized and said fourth actuator locked, said second gyroscopic mass is precessed, applying precessional force to said arm in cooperating relation with precession of said first gyroscopic mass, and with said fourth actuator energized, said second gyroscopic mass is freely precessed to drive said second gyroscopic mass to bring said second pin axis back to said null position.

3. A machine tool as set forth in claim 2 wherein said movable member is a swinging arm of a robotic device.

4. A machine tool as set forth in claim 3 further comprising a movable spindle adapted to receive a tool coupled to a free end of said robotic device.

5. A machine tool as set forth in claim 2 wherein said movable member is a rotary table of a machine tool.

6. A power source for controllably providing rotational power in one plane of motion to a rotating member of a machine tool comprising:

a first gyroscopic mass having a first spin axis, a first gimbal rotatably supporting said first gyroscopic mass so that in a null position, said first spin axis is substantially parallel to said plane of motion and substantially aligned with an axis of a center of rotation of said rotating member, a second gimbal rotatably supported by said rotating member about an axis parallel to an axis of said center of rotation, said second gimbal rotatably supporting said first gimbal for rotation about an axis perpendicular to said first spin axis, first means for applying force between said first gimbal and said second gimbal to displace said first spin axis relative to said arm and in a direction normal to said plane of motion, first means for rotating said second gimbal about said axis parallel to said axis of said center of rotation, and including means for locking said second gimbal to said rotating member during activation of said first means for applying force between said first gimbal and said second gimbal, whereby during said activation of said first means for applying force between said first gimbal and said second gimbal, said first gyroscopic mass is precessed with said second gimbal locked to said rotating member, transferring precessional force to move said rotating member, and during activation of said first means for rotating said second gimbal, said first gyroscopic mass is freely precessed to return said first spin axis back to said null position.

7. A power source as set forth in claim 8 further comprising:

a second gyroscopic mass having a second spin axis, a third gimbal rotatably supporting said second gyroscopic mass so that in a null position, said second spin axis is substantially parallel to said plane of motion and substantially aligned with an axis of a center of rotation of said rotating member, a fourth gimbal rotatably supported for rotation about an axis parallel to an axis of said center of rotation by said rotating member, said fourth gimbal rotatably supporting said third gimbal for rotation about an axis perpendicular to said second spin axis, second means for applying force between said third gimbal and said fourth gimbal to displace said second spin axis of said second gyroscopic mass in a direction normal to said plane of motion, second means for rotating said second gimbal about said axis parallel to said axis of said center of rotation, and including means for locking said fourth gimbal to said rotating member during activation of said second means for applying force between said third gimbal and said fourth gimbal, whereby during said activation of said second means for applying force between said third gimbal and said fourth gimbal, said fourth gimbal is locked to said rotating member, causing precession of said second gyroscopic mass and transferring precessional force to said rotating member in cooperating relation with precessional forces of said first gyroscopic mass, and during activation of said second means for rotating said fourth gimbal, said gyroscopic mass is freely precessed to return said first spin axis back to said null position.

8. A method for powering a rotating member in one plane of rotation comprising the steps of:

1) supporting a gyroscopic mass by a first gimbal so that a spin axis of said gyroscopic mass, in a null position, is generally parallel to said plane of rotation and generally aligned with an axis of a center of rotation of said rotating member, 2) rotatably supporting said first gimbal by a second gimbal rotatably mounted to said rotating member about an axis parallel to said center of rotation, 3) locking said second gimbal to said rotating member, 4) displacing said spin axis of said gyroscopic mass in a plane generally normal to said plane of rotation of said rotating member, causing precession of said gyroscopic mass that rotates said rotating member in said plane of motion, 5) unlocking said second gimbal, 6) displacing said spin axis of said gyroscopic mass in a plane generally parallel to said plane of rotation to freely precess said gyroscopic mass in a direction to bring said spin axis back to said null position without moving said rotating member.

9. A method as set forth in claim 8 further comprising the step of providing a swinging arm of a swinging arm robot as said rotating member.

10. A method as set forth in claim 8 further comprising the step of providing a rotary table of a machine tool as said rotating member.

* * * * *